United States Patent
Noda et al.

(10) Patent No.: US 8,899,698 B2
(45) Date of Patent: Dec. 2, 2014

(54) BRAKING APPARATUS FOR VEHICLE

(75) Inventors: Kazuhiro Noda, Nagano (JP); Ryouji Yamazaki, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1363 days.

(21) Appl. No.: 10/652,853

(22) Filed: Sep. 2, 2003

(65) Prior Publication Data

US 2004/0104617 A1 Jun. 3, 2004

(30) Foreign Application Priority Data

Sep. 3, 2002 (JP) ............................... P.2002-257297

(51) Int. Cl.
*B60T 8/36* (2006.01)

(52) U.S. Cl.
USPC ....................................................... 303/119.3

(58) Field of Classification Search
CPC .......... B60T 8/368; B60T 7/02; B60T 8/4872
USPC .................. 303/119.3, 119.1, 116.1, DIG. 10
See application file for complete search history.

(56) References Cited

U.S. PATENT DOCUMENTS

| | | | |
|---|---|---|---|
| 5,449,226 A * | 9/1995 | Fujita et al. ................. | 303/116.4 |
| 6,234,199 B1 | 5/2001 | Nohira | |
| 6,270,170 B1 | 8/2001 | Isogai et al. | |
| 6,318,818 B1 * | 11/2001 | Brachert et al. ........... | 303/119.2 |

FOREIGN PATENT DOCUMENTS

| | | |
|---|---|---|
| JP | 11208440 | 3/1999 |
| JP | 2000-127935 | 5/2000 |
| JP | 6122364 | 5/2003 |

OTHER PUBLICATIONS

Japanese Office Action for related Application No. 2002-257297, drafted Apr. 14, 2006, 4 pages.

* cited by examiner

*Primary Examiner* — Xuan Lan Nguyen
(74) *Attorney, Agent, or Firm* — Andrew M. Calderon; Roberts Mlotkowski Safran & Cole, P.C.

(57) ABSTRACT

A braking apparatus for a vehicle has: a hydraulic braking pressure control apparatus disposed on a base, including: a control valve unit for switching among a state where hydraulic passages to access a master cylinder are communicated with wheel brakes while the wheel brakes are interrupted from reservoirs, a state where the hydraulic passages are interrupted from the wheel brakes while the wheel brakes are communicated with the reservoirs, and a state where the wheel brakes are interrupted from the hydraulic passages and the reservoirs; pumps; suction valves; and regulators normally communicated the master cylinder with the hydraulic passages as well as interrupt the master cylinder from the hydraulic passages; wherein the suction valves are disposed on the base in positions closer to the suction port of the pumps than the control valve units and the regulators.

25 Claims, 4 Drawing Sheets

BRAKING APPARATUS FOR VEHICLE

BACKGROUND OF THE INVENTION

1. Field of the Invention

The present invention relates to a braking apparatus for a vehicle and in particular to improvement of a braking apparatus for a vehicle which is capable of performing skidding control and traction control of a vehicle.

2. Description of the Related Art

In the related art, such a braking apparatus for a vehicle adjusts the discharge pressure of a pump which draws in a fluid by suction from a master cylinder and discharges the fluid with a suction valve open provided between the suction port of the pump and the master cylinder, thereby performing skidding control and traction control of a vehicle while the brake is not being operated (for example, see the Japanese Patent Laid-Open No. 2000-127935 and Japanese Patent Laid-Open No. 06-122364).

However, on the above-mentioned related-art braking apparatus, a suction valve is disposed on the base relatively apart from the suction port of the pump and the negative pressure transport factor from the suction port of the pump to the suction valve is poor thus the suction efficiency of the pump is poor.

SUMMARY OF THE INVENTION

The present invention has been accomplished in view of the above circumstances and aims at providing a braking apparatus for a vehicle which has improved the suction efficiency of the pump in skidding control and traction control of a vehicle.

In order to attain the above object, the present invention provides a braking apparatus for a vehicle having: a hydraulic braking pressure control apparatus disposed on a metallic base, the hydraulic braking pressure control apparatus including: a control valve unit for switching among a state where hydraulic passages to access a master cylinder are communicated with wheel brakes while the wheel brakes are interrupted from reservoirs, a state where the hydraulic passages are interrupted from the wheel brakes while the wheel brakes are communicated with the reservoirs, and a state where the wheel brakes are interrupted from the hydraulic passages and the reservoirs; pumps for discharging a brake fluid reserved in the reservoir to the hydraulic passages; suction valves provided between the master cylinder and the suction port of the pumps; and regulators normally communicated the master cylinder with the hydraulic passages as well as interrupt the master cylinder from the hydraulic passages when the suction valves are open and letting the hydraulic pressure of the hydraulic passages escape into the master cylinder as the hydraulic pressure of the hydraulic passages exceeds a predetermined value; wherein the suction valves are disposed on the base in positions closer to the suction port of the pumps than the control valve units and the regulators.

With this configuration, it is possible to arrange a suction valve in close proximity to the suction port of a pump, and improve the negative pressure transport factor from the suction port of the pump to the suction valve thus improving the suction efficiency of the pump when the pump is operated to perform skidding control and traction control of a vehicle.

DETAILED DESCRIPTION OF THE PREFERRED EMBODIMENTS

An embodiment of the present invention will be described based on an example shown in the attached drawings.

Figure 1:
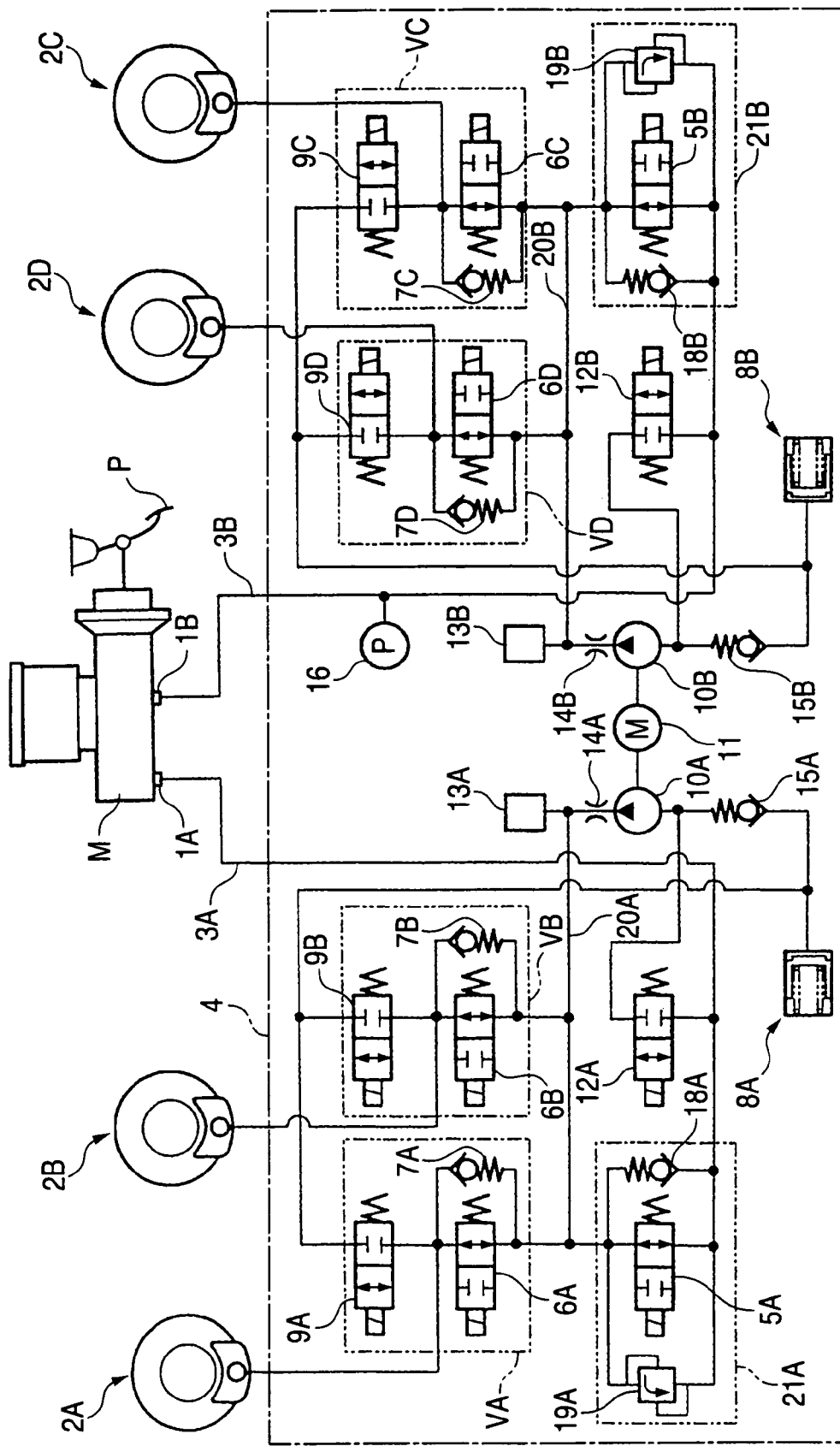
FIG. 1 is a hydraulic circuit diagram showing the configuration of a braking apparatus for a vehicle.
Figure 2:
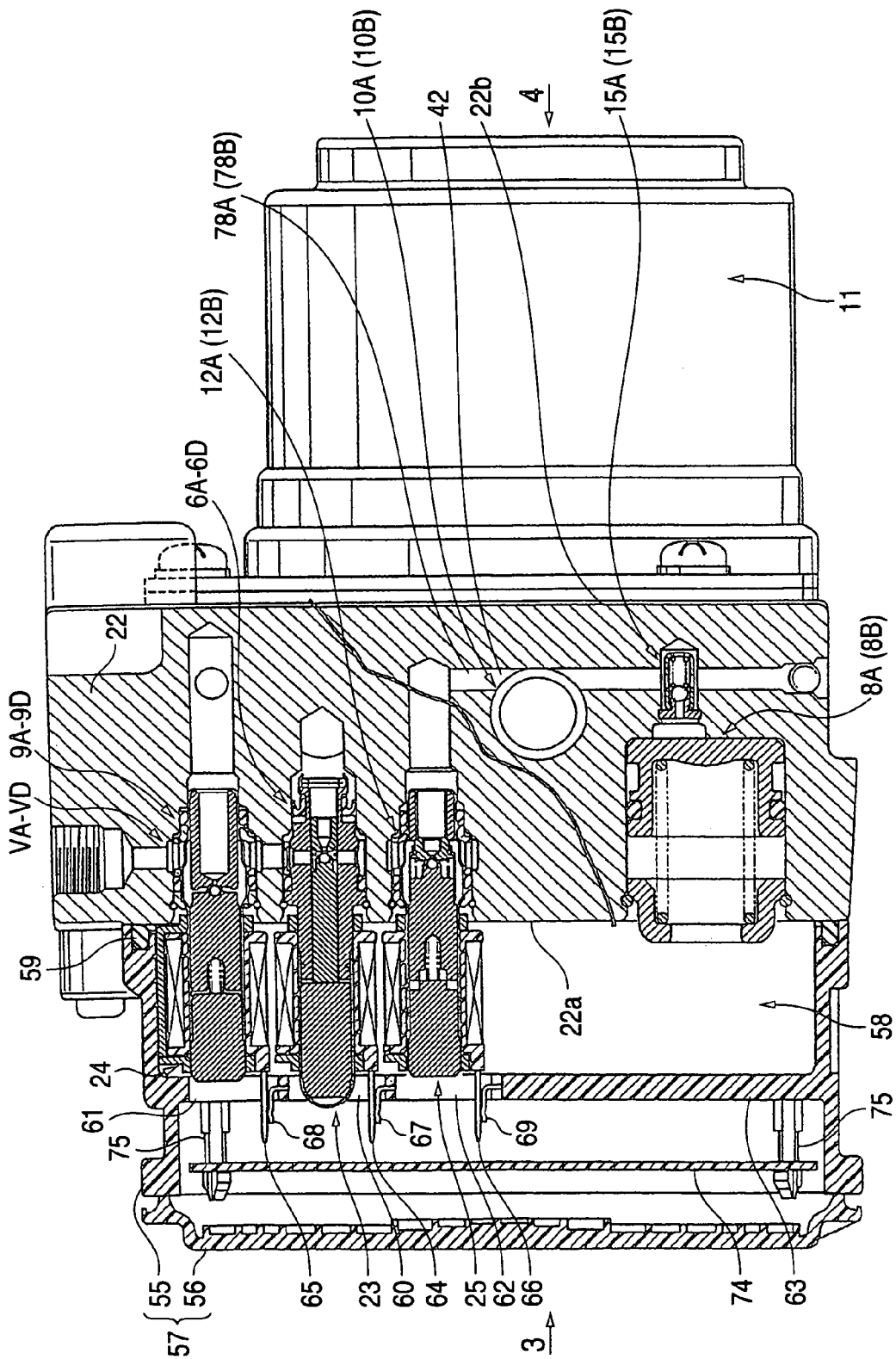
FIG. 2 shows a longitudinal section of a base taken along the line 2-2 of FIG. 3 where a hydraulic braking pressure control apparatus is arranged.
Figure 3:
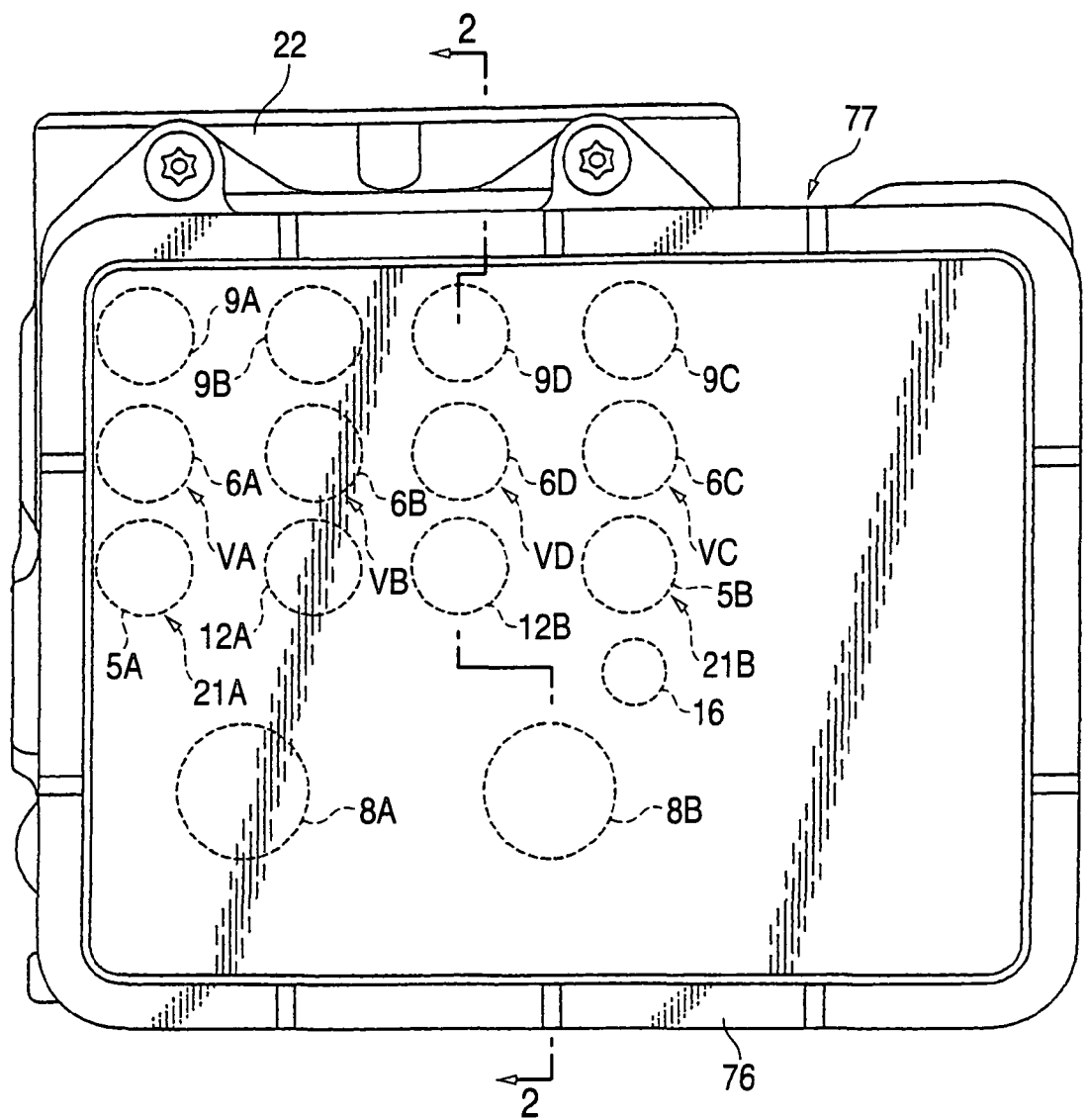
FIG. 3 is a view of FIG. 2 seen in the direction of arrow 3.
Figure 4:
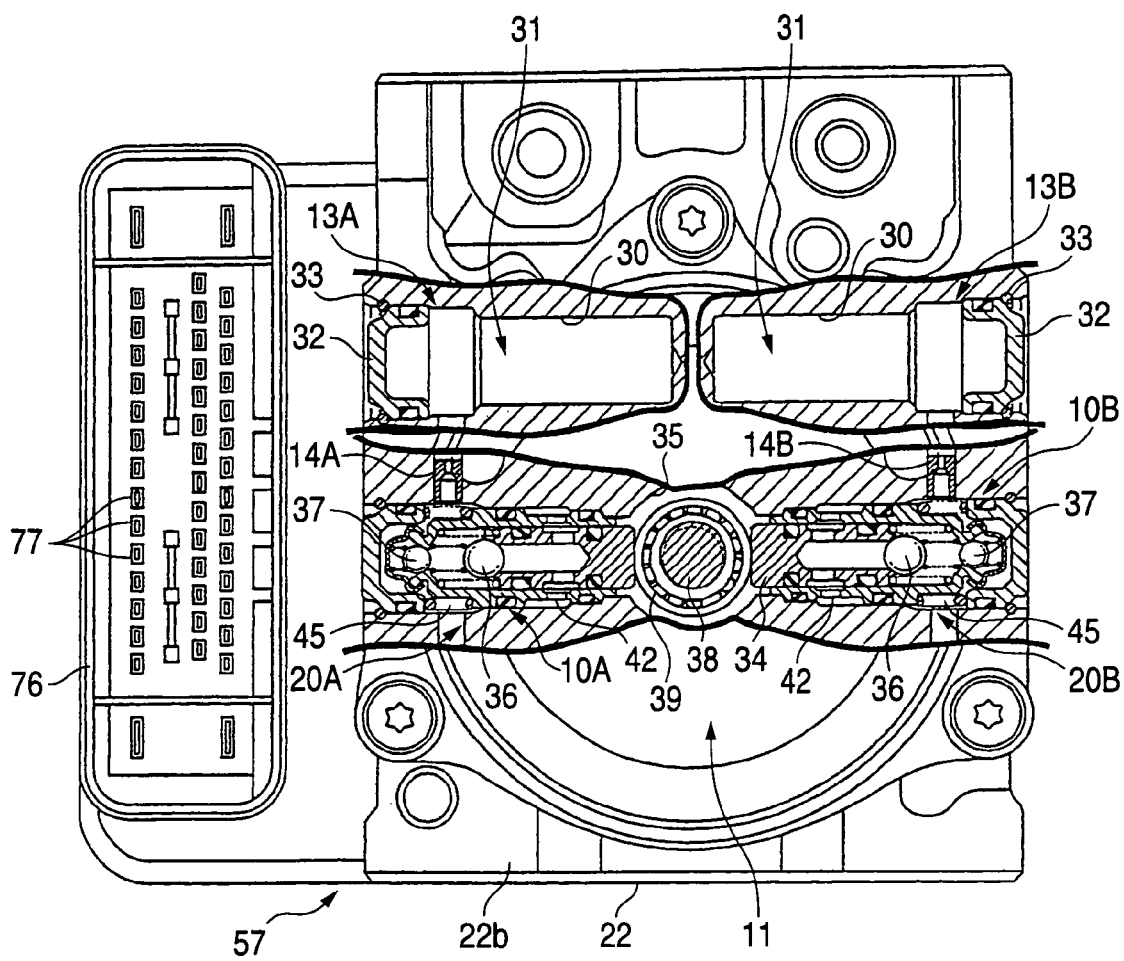
FIG. 4 is a partial front cutaway view of FIG. 2 seen in the direction of arrow 4.

FIGS. 1 through 4 show an embodiment of the present invention. FIG. 1 is a hydraulic circuit diagram showing the configuration of a braking apparatus for a vehicle. FIG. 2 shows a longitudinal section of a base taken along the line 2-2 of FIG. 3 where a hydraulic braking pressure control apparatus is arranged. FIG. 3 is a view of FIG. 2 seen in the direction of arrow 3. FIG. 4 is a partial front cutaway view of FIG. 2 seen in the direction of arrow 4.

First, in FIG. 1, a tandem-type master cylinder M has a first and a second output port 1A, 1B which each generates a brake hydraulic pressure in accordance with a force on pedal applied by a vehicle driver on a brake pedal P. A hydraulic braking pressure control apparatus 4 is provided between a wheel brake for the left front wheel 2A, wheel brake for the right rear wheel 2B, wheel brake for the right front wheel 2C, wheel brake for the left rear wheel 2D and a first and a second output hydraulic passage 3A, 3B individually connected to the first and second output ports 1A, 1B.

The hydraulic braking pressure control apparatus 4 has: control valve unit VA, VB, VC, VD individually corresponding to the wheel brake for the left front wheel 2A, wheel brake for the right rear wheel 2B, wheel brake for the right front wheel 2C and wheel brake for the left rear wheel 2D; a first and a second reservoir 8A, 8B individually corresponding to the first and second output hydraulic passages 3A, 3B; a first and a second pump 10A, 10B having suction ports connected to the first and second reservoirs 8A, 8B and discharge ports connected to the hydraulic passages 20A, 20B; a common electric motor 11 for driving both pumps 10A, 10B; suction valves 12A, 12B as normally closed solenoid valves respectively provided between the first and second hydraulic passages 3A, 3B and the suction ports of the first and second pumps 10A, 10B; a first and second damper 13A, 13B respectively provided between the discharge ports of the first and second pumps 10A, 10B and the hydraulic passages 20A, 20B; a first and a second orifice 14A, 14B respectively provided between the first and second pumps 10A, 10B and the first and second dampers 13A, 13B; check valves 15A, 15B provided between the first and second pumps 10A, 10B and the first and second reservoirs 8A, 8B so as to allow the flow of a brake fluid to each pump 10A, 10B; a pressure sensor 16 attached to the second output hydraulic passage 3B; and regulators 21A, 21B respectively provided between the first and second output hydraulic passages 3A, 3B and the hydraulic passages 20A, 20B.

The control valve unit VA, VB has: normally open solenoid valves 6A, 6B respectively provided between the hydraulic passage 20A, and the wheel brake for the left front wheel 2A and the wheel brake for the right rear wheel 2B; normally closed solenoid valves 9A, 9B respectively provided between the wheel brake for the left front wheel 2A and the wheel brake for the right rear wheel 2B, and the first reservoir 8A; and check valves 7A, 7B respectively connected in parallel with the normally open solenoid valves 6A, 6B so as to allow the flow of a brake fluid to the hydraulic passage 20A. The control valve unit VC, VD has: normally open solenoid valves 6C, 6D respectively provided between the hydraulic passage 20B, and the wheel brake for the right front wheel 2C and the wheel brake for the left rear wheel 2D; normally closed solenoid valves 9C, 9D respectively provided between the wheel brake for the right front wheel 2C and the wheel brake for the left rear wheel 2D, and the second reservoir 8B; and check valves 7C, 7D respectively connected in parallel with the normally open solenoid valves 6C, 6D so as to allow the flow of a brake fluid to the hydraulic passage 20B.

Such control valve unit VA through VD switch between a state where hydraulic passages 20A, 20B to access the master cylinder M are communicated with the wheel brakes 2A through 2D while the wheel brakes 2A through 2D are interrupted from the reservoirs 8A, 8B, a state where the hydraulic passages 20A, 20B are interrupted from the wheel brakes 2A through 2D while the wheel brakes 2A through 2D are communicated with the reservoirs 8A, 8B, and a state where the wheel brakes 2A through 2D are interrupted from the hydraulic passages 20A, 20B and the reservoirs 8A, 8B.

The suction valves 12A, 12B are respectively provided between the first and second pumps 10A, 10B and the check valves 15A, 15B, and the output hydraulic passages 3A, 3B.

The regulators 21A, 21B has normally open solenoid valves 5A, 5B, one-way valves 18A, 18B, and relief valves 19A, 19B connected in parallel between the first and second output hydraulic passages 3A, 3B and the check valves 15A, 15B, and the hydraulic passages 20A, 20B.

The one-way valves 18A, 18B are connected in parallel with the normally open solenoid valves 5A, 5B so as to allow the flow of a brake fluid from the first and second output hydraulic passages 3A, 3B. The relief valves 19A, 19B are connected in parallel with the normally open solenoid valves 5A, 5B so as to open as the hydraulic pressure of the hydraulic passages 20A, 20B exceeds a predetermined value.

The regulators 21A, 21B normally communicates the first and second output hydraulic passages 3A, 3B, and the hydraulic passages 20A, 20B each accessing the master cylinder M. When the suction valves 12A, 12B are open, the regulators 21A, 21B interrupt the output hydraulic passages 3A, 3B from the hydraulic passages 20A, 20B and lets the hydraulic pressure of the hydraulic passages 20A, 20B escape into the master cylinder M as the hydraulic pressure of the hydraulic passages 20A, 20B exceeds a predetermined value, thereby controlling the hydraulic pressure of the hydraulic passages 20A, 20B below a predetermined value.

The pressure sensor 16 detects whether a hydraulic pressure is output from the master cylinder M, that is, whether the brake pedal P is pressed. The pressure sensor 16 is used for the aforementioned skidding control and traction control of a vehicle as well as control of the rotation speed of the electric motor 11 in accordance with the output hydraulic pressure of the master cylinder M.

On the hydraulic braking pressure control apparatus 4, with the normally open solenoid valves 5A, 5B placed in the demagnetized and open state and the suction valves 12A, 12B placed in the demagnetized and closed state when there is no possibility of lock for each wheel, each control valve unit VA through VD communicates the master cylinder M with the wheel brakes 2A through 2D as well as interrupts the wheel brakes 2A through 2D from the reservoirs 8A, 8B. In other words, the normally open solenoid valves 6A through 6D are placed in the demagnetized and open state while the normally closed solenoid valves 9A through 9D are placed in the demagnetized and closed state. The brake hydraulic pressure output from the first output port 1A of the master cylinder M acts on the wheel brakes for the left front wheel and the right rear wheel brake 2A, 2B via the solenoid valve 5A and the normally open solenoid valves 6A, 6B. The brake hydraulic pressure output from the second output port 1B of the master cylinder M acts on the wheel brakes for the right front wheel and the left rear wheel 2C, 2D via the solenoid valve 5B and the normally open solenoid valves 6C, 6D.

When a wheel which is likely to become locked in the above braking, the control valve unit VA through VD interrupt the master cylinder M from the wheel brakes 2A through 2D at a point corresponding to the wheel which is likely to become locked as well as communicates the wheel brakes 2A through 2D with the reservoirs 8A, 8B. In other words, the normally open solenoid valve out of the normally open solenoid valves 6A through 6D corresponding to a wheel which is likely to become locked is magnetized and closed while the normally closed solenoid valve out of the normally closed solenoid valves 9A through 9D corresponding to the wheel is magnetized and opened. With this process, part of the brake hydraulic pressure of the wheel which is likely to become locked is absorbed in the first reservoir 8A or second reservoir 8B thereby reducing the brake hydraulic pressure of the wheel which is likely to become locked.

To keep the brake hydraulic pressure constant, the control valve unit VA through VD interrupt the wheel brakes 2A through 2D from the master cylinder M and the reservoirs 8A, 8B. In other words, the normally open solenoid valves 6A through 6D are magnetized and closed while the normally closed solenoid valves 9A through 9D are demagnetized and closed.

When the brake hydraulic pressure is increased, the normally open solenoid valves 6A through 6D are demagnetized and opened while the normally closed solenoid valves 9A through 9D are demagnetized and closed. The control valve unit VA through VD communicate the master cylinder M with the wheel brakes 2A through 2D as well as interrupt the wheel brakes 2A through 2D from the reservoirs 8A, 8B.

In this way, by controlling demagnetization and magnetization of the normally open solenoid valves 6A through 6D and the normally closed solenoid valves 9A through 9D on the control valve unit VA through VD with the solenoid valves 5A, 5B placed in the demagnetized and open state and the suction valves 12A, 12B placed in the demagnetized and closed state, it is possible to control the wheels without locking them.

In the anti-lock brake control process mentioned above, the electric motor 11 rotates. With the operation of the electric motor 11, the first and second pumps 10A, 10B are driven. The brake fluid absorbed in the first and second reservoirs 8A, 8B is drawn into the first and second pumps 10A, 10B then refluxed into the first and second output hydraulic passages 3A, 3B via the first and second dampers 13A, 13B. By way of the reflux of the brake fluid, it is possible to prevent an increase in the pressing amount of the brake pedal P due to absorption of the brake fluid by the first and second reservoirs 8A, 8B. The pulsing of the discharge pressure of the first and second pumps 10A, 10B is suppressed by the action of the first and second dampers 13A, 13B and the first and second orifices 14A, 14B. This assures that the above reflux will not disrupt the feel of operation of the brake pedal P.

The hydraulic braking pressure control apparatus 4 can perform skidding control and traction control of a vehicle in the non-braking state, in addition to the anti-lock brake control.

For example, in skidding control, the solenoid valves 5A, 5B of the regulators 21A, 21B are placed in the magnetized and closed state and the suction valves 12A, 12B are placed in the magnetized and open state. By way of the operation of the electric motor 11, the first and the second pumps 10A, 10B are driven. The normally open solenoid valves other than those corresponding to the wheels to be braked out of the normally open solenoid valves 6A, 6D are placed in the magnetized and closed state.

This causes the pumps 10A, 10B to draw in the brake fluid of the master cylinder M from the first and second output ports 1A, 1B via the first and second output hydraulic passages 3A, 3B and the suction valves 12A, 12B, supply the brake fluid to a wheel brake selected out of the wheel brakes 2A through 2D via the normally open solenoid valves in the open state out of the normally open solenoid valves 6A through 6D, while preventing the reflux of the brake fluid toward the master cylinder by placing the solenoid valves 5A, 5B in the open state.

In case the hydraulic pressure of the hydraulic passages 20A, 20B where the discharge hydraulic pressure of the first and second pumps acts exceeds a predetermined value in the skidding control and traction control, the hydraulic pressure in excess escapes toward the master cylinder by way of the relief valves 19A, 19B of the regulators 21A, 21B. This prevents the hydraulic pressure in excess from acting on the wheel brakes where brake pressure is acting.

The dampers 13A, 13B are provided between the hydraulic passages 20A, 20B and the orifices 14A, 14B. It is thus possible to absorb the pulsing generated in the hydraulic passages 20A, 20B by the operation of the regulators 21A, 21B by the dampers 13A, 13B, thereby suppressing the operation sound caused by the pulsing due to the operation of the regulators 21A, 21B.

In FIGS. 2 through 4, the hydraulic braking pressure control apparatus 4 is provided on a base 22 formed into a block by way of for example a metal such as an aluminum alloy. The base 22 where the hydraulic braking pressure control apparatus 4 is provided is attached to a vehicle body (not shown).

The normally open solenoid valves 6A through 6D incorporating the check valves 7A through 7D and the normally closed solenoid valves 9A through 9D are attached to the base 22 aligned so as to protrude their solenoid sections 23 . . . , 24 . . . from one face 22a of the base 22. The suction valves 12A, 12B is attached to the base 22 aligned so as to protrude their solenoid sections 25 . . . from the one face 22a in a position where the normally open solenoid valves 6B, 6C sandwiched between the normally closed solenoid valves 9B, 9C. The normally open solenoid valves 5A, 5B incorporating the one-way valves 18A, 18B and the relief valves 19A, 19B so as to constitute the regulators 21A, 21B in cooperation with the one-way valves 18A, 18B and the relief valves 19A, 19B is attached to the base 22 on both sides of the suction valves 12A, 12B so as to protrude their solenoid sections from the one face 22a.

The pressure sensor 16 is attached to the base 22 below the regulator 21A with part of the pressure sensor 16 protruding from the one face 22a. The first and second dampers 13A, 13B has: bottomed damper holes 30 . . . provided coaxially on the base 22 so as to open on the left and right sides of the base 22 orthogonally to the axes of the normally open solenoid valves 6A through 6D; lid members 32 . . . fitted into the opening ends of the damper holes 30 . . . in a fluid-tight way while forming damper chambers 31 . . . between the lid members 32 . . . and the damper holes 30 . . . ; and snap rings 33 . . . attached to the opening ends of the damper holes 30 . . . so as to prevent the lid members 32 . . . from dropping off the damper holes 30.

To the damper chamber 31 of the first damper 13A is connected the normally open solenoid valves 6A, 6B. To the damper chamber 31 of the second damper 13B is connected the normally open solenoid valves 6C, 6D.

The first and second pumps 10A, 10B are disposed on the base 22 while having a coaxial operation axis along the direction of arrangement of the normally open solenoid valves 6A through 6D at approximate points corresponding to the pressure sensor 16. Plungers 34 . . . of the pumps 10A, 10B is arranged in positions spaced from each other so that one end of a plunger 34 will face the concave section 35 provided in the center of the other face 22b of the base 22. In the pumps 10A, 10B are respectively incorporated a suction valve 36 and a discharge valve 37.

The electric motor 11 is attached to the other face 22b of the base 22 so as to protrude its output shaft 38 into the concave section 35. To the output shaft 38 is attached a ball bearing 39 eccentrically away from the output shaft 38, the ball bearing 39 slidably in contact with the tip of the plungers 34 . . . of the pumps 10A, 10B. When the output shaft 38 is rotated by the operation of the electric motor 11, an eccentric motion is given to the ball bearing 39, thus driving the plungers 34 . . . of the pumps 10A, 10B into reciprocating motion.

The first and second reservoirs 8A, 8B are provided on the base 22 close to the one face 22a. The first and second check valves 15A, 15B are provided on the base 22 so as to be arranged between the first and second reservoirs 8A, 8B and the first and second pumps 10A, 10B. The first and second orifices 14A, 14B are fitted between the discharge port 45 of the first and second pumps 10A, 10B and the first and second dampers 13A, 13B.

To the one face 22a of the base 22 is fastened a cover 57 comprising, at one end of a first resin molded form 55 formed into a cylindrical shape having a rectangular cross section, a second resin molded form 56 filling the opening on one end of the first resin molded form 55, the second resin molded form 56 welded by way of vibration. The cover 57 houses the solenoid sections 23 . . . of the normally open solenoid valves 6A through 6D, the solenoid sections 24 . . . of the normally closed solenoid valves 9A through 9D, the solenoid sections 25 . . . of the suction valves 12A, 12B, and the solenoid sections of the normally open solenoid valves 5A, 5B. The cover 57 is fastened to the one face 22a of the base 22 so as to form a chamber 58 to house the solenoid sections of the normally open solenoid valves 5A, 5B as well as part of the first and second reservoirs 8A, 8B and part of the pressure sensor 16 between the cover 57 and the base 22. At the edge of the cover facing the base 22 of the cover 57 is attached an endless seal member 59 in bouncing contact with the one face 22a of the base 22.

In the intermediate section of the first resin molded form 55 in the cover 57 are formed, integrally with the one face 22a of the base 22 while faced thereto, a plane-shaped wall section 63 having rectangular openings 60 . . . , 61 . . . , 62 . . . individually corresponding to the solenoid sections 23 . . . of the normally open solenoid valves 6A through 6D, the solenoid sections 24 . . . of the normally closed solenoid valves 9A through 9D, the solenoid sections 25 . . . of the suction valves 12A, 12B, and the solenoid sections of the normally open solenoid valves 5A, 5B, respectively.

The tips of the solenoid sections 23 . . . , 24 . . . , 25 . . . are inserted into the openings 60 . . . , 61 . . . , 62 . . . and connection terminals 64 . . . , 65 . . . , 66 . . . on the solenoid valves protruded pair by pair from the solenoid sections 23 . . . , 24 . . . , 25 . . . are protruded to extend in the openings 60 . . . , 61 . . . , 62 . . . .

Into the wall section 63 are embedded individual bus bars of a conductive metal (not shown) individually corresponding to the normally open solenoid valves 6A through 6D, the normally closed solenoid valves 9A through 9D, the normally open solenoid valves 5A, 5B, and the suction valves 12A, 12B, respectively, and a single common bus bar a conductive metal (not shown) corresponding in common to the solenoid valves 6A through 6D, 9A through 9D, 5A, 5B, and the suction valves 12A, 12B.

On one end of the connection terminals 64 . . . , 65 . . . , 66 . . . on the solenoid valves are electrically connected connection terminals 67 . . . , 68 . . . , 69 . . . on the individual bus bars formed at one end of the individual bus bars. On the other end of the connection terminals 64 . . . , 65 . . . , 66 . . . on the solenoid valves are electrically connected a plurality of connection terminals on the common bus bar (not shown) formed on the common bus bar.

The pressure sensor 16 is also electrically connected to the bus bar of a conductive metal embedded into the wall section 63.

In the cover 57, between the second resin molded form 56 and the wall section 63 of the cover 57, is arranged a control substrate 74 mounting an electric circuit. The control substrate 74 is supported fixedly on a plurality of support bosses 75 protruded on the wall section 63.

The individual bus bars and the common bus bar corresponding to the normally open solenoid valves 6A through 6D, the normally closed solenoid valves 9A through 9D, the normally open solenoid valves 5A, 5B, and the suction valves 12A, 12B are electrically connected to the electric circuit on the control substrate 74. The other end of the bus bar corresponding to the pressure sensor 16 is electrically connected to the electric circuit on the control substrate 74 so as to penetrate the control substrate 74.

A coupler 76 is formed integrally with the cover 57 while extending laterally from the base 22. A plurality of connection terminals 77 . . . connected to the control substrate 74 are arranged in the coupler 76.

According to the present invention, as shown in FIG. 2, the suction valves 12A, 12B provided between the master cylinder M and the suction port 42 of each of the first and second pumps 10A, 10B are disposed on the base 22 in positions closer to the suction port 42 of each of the first and second pumps 10A, 10B than the control valve unit VA, VB, VC, VD and the regulators 21A, 21B. Passages 78A, 78B provided on the base 22 so as to link the suction valves 12A, 12B and the suction port 42 of each of the pumps 10A, 10B are formed in a very short length.

The operation of this embodiment will be described. The suction valves 12A, 12B are disposed on the base 22 in positions closer to the suction port 42 of each of the pumps 10A, 10B than the control valve unit VA through VD and the regulators 21A, 21B. It is possible to arrange the suction valves 12A, 12B in close proximity to the suction port 42 of each of the pumps 10A, 10B. Thus it is possible to improve the negative pressure transport factor from the suction port 42 of each of the pumps 10A, 10B to the suction valves 12A, 12B, thereby improving the suction efficiency of the pumps 10A, 10B, when the pumps 10A, 10B are operated with the suction valves 12A, 12B opened in order to perform skidding control and traction control of a vehicle.

While the embodiment of the present invention has been described hereinabove, the present invention is not limited to the foregoing embodiment. Various design changes can be made in the present invention without departing from the spirit and scope defined in the claims.

As mentioned hereinabove, according to the present invention, it is possible to improve the negative pressure transport factor from the suction port of a pump to a suction valve, thereby improving the suction efficiency of the pump.

What is claimed is:

1. A braking apparatus for a vehicle comprising:
a hydraulic braking pressure control apparatus disposed on a base, the hydraulic braking pressure control apparatus including:
control valve units being disposed in a first row;
solenoid valves being disposed in a second row;
regulators being disposed in a third row;
suction valves being disposed in the third row between the regulators; and
pumps for discharging a brake fluid reserved in reservoirs to hydraulic passages, the pumps including suction ports and discharge ports, the suction ports being arranged inside relative to the discharge ports, wherein
in a vertical orientation relative to any of the first, second and third row, the pumps are displaced in a last row with relation to one of the control valve units, solenoid valve and regulators.

2. The braking apparatus of claim 1, wherein the control valve units are configured to switch among a state where the hydraulic passages to access a master cylinder are communicated with wheel brakes while the wheel brakes are interrupted from the reservoirs, a state where the hydraulic passages are interrupted from the wheel brakes while the wheel brakes are communicated with the reservoirs, and a state where the wheel brakes are interrupted from the hydraulic passages and the reservoirs.

3. The braking apparatus of claim 2, wherein the suction valves are provided between the master cylinder and the suction ports of the pumps.

4. The braking apparatus of claim 3, wherein the regulators normally communicate the master cylinder with the hydraulic passages, interrupt the master cylinder from the hydraulic passages when the suction valves are open and let the hydraulic pressure of the hydraulic passages escape into the master cylinder as the hydraulic pressure of the hydraulic passages exceeds a predetermined value.

5. The braking apparatus of claim 4, wherein the suction valves are disposed on the base in positions closer to the suction ports of the pumps than the control valve units and the regulators, and the regulators are disposed on the base in positions closer to the suction port of the pumps than the control valve units.

6. The braking apparatus of claim 1, wherein respective hydraulic passageways of the reservoirs intersect and communicate with respective hydraulic passageways of the suction valves.

7. The braking apparatus of claim 6, wherein:
a hydraulic passageway of the reservoir is substantially orthogonal to and is isolated from the respective hydraulic passageways of the suction valves, and
a hydraulic passageway of the suction valves interconnect with the adjacent regulators, and is isolated from the respective hydraulic passageways of the reservoirs.

8. The braking apparatus of claim 1, wherein the first row includes normally closed electromagnetic valves and the second row includes normally open electromagnetic valves.

9. The braking apparatus of claim 8, wherein the suction valves are provided in an uninterrupted flow path with the pumps and a single check valve in fluid communication with the reservoirs, and output hydraulic passages in fluid communication with a master cylinder.

10. The braking apparatus of claim 1, wherein each of the regulators include a normally open solenoid valve, a one-way valve, and a relief valve on an opposing side of the normally open solenoid valve to the one-way valve, all connected in parallel between output hydraulic passages and a check valve in a flow path with the reservoirs, and the hydraulic passages.

11. The braking apparatus of claim 1, wherein the control valve units include normally open solenoid valves which incorporate check valves and normally closed solenoid valves, the normally closed solenoid valves are aligned on the base so as to protrude their solenoid sections from one face of the base.

12. The braking apparatus of claim 1, further comprising a pressure sensor on the base below the regulators.

13. The braking apparatus of claim 12, further comprising dampers in a fluid path with the pumps, the dampers include bottomed damper holes provided coaxially on the base so as to open on sides of the base orthogonally to an axes of normally open solenoid valves of the control valve units in the first row.

14. The braking apparatus of claim 13, further comprising:
lid members fitted into opening ends of the damper holes in a fluid-tight manner to form damper chambers between the lid members and the damper holes; and
snap rings attached to the opening ends of the damper holes to prevent the lid members from disengaging from the damper holes.

15. The braking apparatus of claim 1, wherein:
the regulators are in fluid communication with front and rear brakes;
the suction valves are in fluid communication with front and rear brakes; and
hydraulic fluid passing through the regulators and the suction valves affects operations of the front and rear brakes.

16. A braking apparatus for a vehicle comprising:
a hydraulic braking pressure control apparatus disposed on a base, the hydraulic braking pressure control apparatus including:
a series of control units positioned in a first row;
a series of solenoid valves positioned in a second row;
regulators positioned in a third row with suction valves disposed therebetween in the third row; and
pumps including suction ports being arranged inside relative to discharge ports, wherein
respective hydraulic passageways of the reservoirs intersect and communicate with respective hydraulic passageways of the suction valves,
a hydraulic passageway of the reservoir is substantially orthogonal to and does not interconnect with the respective hydraulic passageways of the suction valves, and
a hydraulic passageway of the suction valves interconnect with the adjacent regulators, and does not intersect with the respective hydraulic passageways of the reservoirs and the hydraulic passageway of the reservoir.

17. The braking apparatus of claim 16, further comprising a pressure sensor positioned below the third row and above the reservoir.

18. The braking apparatus of claim 16, wherein the series of control units are configured for switching among a state where a hydraulic passage to access a master cylinder is communicated with wheel brakes while the wheel brakes are interrupted from a reservoir, a state where the hydraulic passage is interrupted from the wheel brakes while the wheel brakes are communicated with the reservoir, and a state where the wheel brakes are interrupted from the hydraulic passage and the reservoir.

19. The braking apparatus of claim 16, wherein the pumps are configured for discharging a brake fluid reserved in the reservoir to the hydraulic passage.

20. The braking apparatus of claim 16, wherein:
the suction valves are provided between the master cylinder and the suction port of the pumps;
the solenoid valves are open and closed solenoid valves aligned in the second row on the base and the regulator and the suction valves are substantially aligned in the third row on the base closer to the pump than the series of control units; and
the suction valves are disposed on the base in a position closer to the suction port of the pump than the regulator.

21. The braking apparatus of claim 16, wherein the suction ports of the pumps are arranged inside relative to discharge ports, and the pumps are disposed in a vertical orientation in a last row relative to a last one of the control valve units in the first row, solenoid valves in the second row and an outer regulator in the third row.

22. The braking apparatus of claim 16, wherein:
the regulators are in fluid communication with front and rear brakes;
the suction valves are in fluid communication with front and rear brakes; and
hydraulic fluid passing through the regulators and the suction valves affects operations of the front and rear brakes.

23. A braking apparatus for a vehicle comprising:
a hydraulic braking pressure control apparatus disposed on a base, the hydraulic braking pressure control apparatus including:
a first series of control valve units being disposed in a first row;
a second series of control valve units being disposed in a second row;
regulators being disposed in a third row and in fluid communication with front and rear brakes;
suction valves being disposed in the third row between the regulators and in fluid communication with front and rear brakes; and
pumps for discharging a brake fluid reserved in reservoirs to hydraulic passages, the pumps including suction ports and discharge ports,
wherein hydraulic fluid passing through the regulators and the suction valves affects operations of the front and rear brakes.

24. The braking apparatus of claim 23, wherein:
the suction ports of the pumps are arranged inside relative to the discharge ports, and the pumps are arranged in a vertical orientation relative to any of the first, second and third row, the pumps are displaced in a last row with relation to one of the control valve units, and regulator; and
the second series of control valve units are solenoid valves.

25. The braking apparatus of claim 23, wherein:
respective hydraulic passageways of the reservoirs intersect and communicate with respective hydraulic passageways of the suction valves;
a hydraulic passageway of the reservoirs are substantially orthogonal to and is isolated from the respective hydraulic passageways of the suction valves, and
a hydraulic passageway of the suction valves interconnect with the adjacent regulators, and is isolated from the respective hydraulic passageways and the hydraulic passageway of the reservoirs.

* * * * *